Aug. 23, 1960  A. GOLDHAMMER  2,949,832
PHOTOGRAPHIC CAMERA WITH QUICK WINDING ATTACHMENT
Filed Dec. 8, 1958

INVENTOR.
Albert Goldhammer

United States Patent Office 2,949,832
Patented Aug. 23, 1960

2,949,832

PHOTOGRAPHIC CAMERA WITH QUICK WINDING ATTACHMENT

Albert Goldhammer, Nussdorf, Baden, Germany, assignor to Bodenseewerk Perkin-Elmer & Co., G.m.b.H., Uberlingen, Bodensee, Germany Filed Dec. 8, 1958, Ser. No. 779,024

Claims priority, application Germany Dec. 7, 1957

3 Claims. (Cl. 95—31)

This invention is concerned with a photographic camera with quick winding attachment, i.e., a camera in which the forward movement of the film and the tensioning of the shutter is effected by a rotating motion of a hand lever. Hitherto, this hand lever has been so arranged on the camera that it was operated by the thumb of the hand holding the camera by performing a rotating motion from the back of the camera towards its front. It is necessary with such an arrangement of the hand lever to provide an intermediate gear between the shaft of the hand lever and the film-feed roll so as to obtain the correct rotation of the film-feed roll.

The invention starts out from the realization that operation of the hand lever by means of the thumb is not a necessary requirement and is not even the most favorable manner of operation. It must therefore be considered inadvisable to provide a relatively expensive gear system in order to make thumb operation of the hand lever possible.

The invention has therefore for its object the provision of a hand lever to be operated from the front of the camera by means of a finger movement performed in a clockwise direction. The middle finger or the ring finger of the photographer's hand holding the camera can then be used to operate the hand lever whereby a rotating movement of the hand lever is effected which has such a direction of rotation that an intermediate gear becomes unnecessary.

The hand lever is advantageously arranged—when viewed in the direction of the object to be photographed—beneath the bottom of the camera housing. The operation of the hand lever is then particularly convenient and handy. With such an arrangement of the hand lever, the gear system for the tensioning of the shutter and the film-feed may be accommodated in the bottom of the camera, so that no space is required for these elements in the upper part of the camera housing, where normally elements for other functions have to be arranged.

An arrangement of the hand lever as suggested in accordance with the invention necessitates a special design of the ever-ready case. The junction between the bottom and the side wall of the ever-ready case must be interrupted by a slot shaped opening in the zone of the hand lever movement. Means must be provided at the cutaway portion of the side wall provided for the camera lens which permit the fastening of the side wall of the ever-ready case at the camera housing. Without such a fastening of the side wall of the ever-ready case at the camera housing, which may be effected by means of a press button or an eyelet, the side wall of the ever-ready case would no longer have sufficient rigidity and therefore could be easily deformed.

Further developing the idea of the invention, the quick winding gearing is so designed that an intermediate lever, which actuates the tensioning mechanism of the shutter, is mounted co-axially respect to the hand lever. This intermediate lever has a dog or driver which is operated by the hand lever, so that the intermediate lever, in turn, rotates a gear wheel that engages the film-feed roll. A simple mechanism which can be easily manufactured and which requires little space is obtained by such an arrangement. It is possible, in particular, to provide separate return springs for the hand lever, so that the hand lever can also return to its initial position independently of the intermediate lever. For example, the end of the film may prevent the film feed mechanism from reaching its end position which would enable the lever to return.

The invention is more fully described in the following detailed description where reference is made to a preferred embodiment illustrated schematically in Figs. 1 to 3 of the accompanying drawings wherein.

Figure 1:
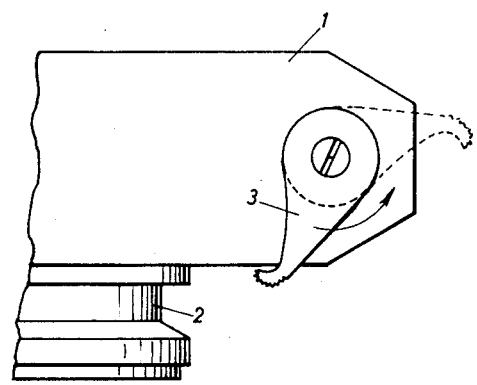
Fig. 1 is a partial bottom view of a camera embodying the invention.

Referring to Fig. 1 in which a partial view of the bottom of a camera housing 1 is shown. Numeral 2 designates the camera lens. A rotatable hand lever 3 is arranged beneath the camera bottom and is rotated in the direction of the arrow up to the position shown in the drawing by the dotted line. If the camera 1 is held in the normal position with the bottom of the housing downwards, a clockwise movement of the finger—the middle or the ring finger—is performed from the front of the camera towards its back when rotating the lever 3 without thereby letting the camera loose.

Figure 2:
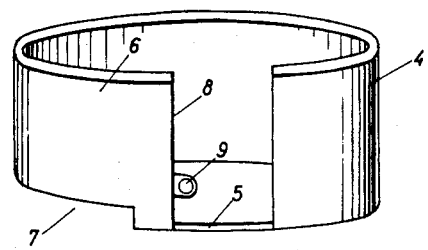
Fig. 2 is an illustration of a camera case suitable for use with the present invention.

Fig. 2 shows the lower portion 4 of an ever-ready case designed to fit a camera according to the invention. The junction between the bottom 5 and the side wall 6 of the ever-ready case is interrupted in the zone of movement of the hand lever 3 by means of a slot shaped recess or opening 7 so as to give access to the hand lever 3. Since the side wall 6 no longer has sufficient rigidity, a press button 9 or other suitable fastening element is provided at the cutaway portion 8 of the side wall 6. The press button 9 then allows the fastening of the side wall 6 to the camera housing 1.

Figure 3:
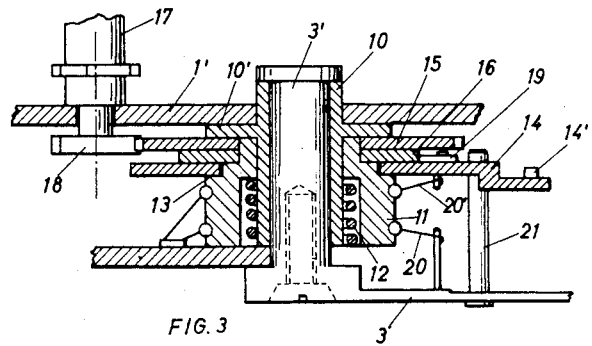
Fig. 3 is a partial, cross-sectional elevation of an apparatus embodying the invention.

Referring now to Fig. 3 which shows the gear system to be operated by the hand lever 3 in sectional illustration, numeral 1' designates an intermediate wall of the housing 1 on which is mounted a bearing bushing 10 provided with a flange 10'. The bearing journal 3' of the hand lever 3 rotates in said bearing bushing 10. An intermediate bushing 11 is supported by the bearing bushing 10 and coupled with the latter bushing by means of a spring controlled return stop 12. Thus, the intermediate bushing 11 can only rotate in one direction on the bearing bushing 10. An intermediate lever 14 engaging the not represented gear system of a shutter tensioning mechanism by means of a crank pin 14' is supported by a collar 13 of the intermediate bushing 11. A gear 15 and a ratchet wheel 16 are rigidly connected with the intermediate bushing 11. The gear 15 meshes directly with a pinion 18 mounted on the shaft of the film-feed roll 17. The ratchet wheel 16 forms—together with a pawl 19 mounted on the intermediate lever 14—a controlling mechanism of the well known delta-star type. Separate return springs 20, 20' are provided for the hand lever 3 and the intermediate lever 14. These return springs are designed as tension springs fixed at the housing and placed around the intermediate bushing 11. The hand lever 3 has a driver pin 21 which engages the intermediate lever 14 when the hand lever 3 is rotated. When so actuated by the rotating movement of the hand lever 3, the intermediate lever 14 operates the shutter tensioning mechanism through the crank pin 14'. The rotation of the intermediate lever 14 has at the same time the effect that, by the action of the controlling mechanism 16/19, the intermediate bushing 11 and the gear 15 connected therewith are rotated by a definitive angle, so that the film is moved forward by the length of one negative format by the film-feed roll 17. After the intermediate lever 14 has completed its full feed path, the delta-star gearing 16, 19 allows the intermediate lever 14 to return, so that the latter lever and the hand lever 3 can return into their initial position under the influence of the return springs 20, 20'. If, however, the intermediate lever 14 is prevented from completing its full feed path, because the film end does not allow any further movement and thus any further rotation of the film-feed roll is impossible, the controlling mechanism 16, 19 does not yet permit the intermediate lever 14 to return so that it is blocked in an intermediate position. Only after the film has been removed from the camera can the intermediate lever 14 complete its feed path and return to its initial position. But the hand lever 3 can return to its initial position, even if the intermediate lever 14 is blocked in an intermediate position, so that there is no need for said hand lever 3 to remain in an obstructing intermediate position when the winding mechanism is blocked by the film end.

I claim:

1. Photographic camera apparatus comprising a camera body; first lever means positioned on said body to rotate about an axis thereon; second lever means in actuating relationship to tension the shutter of said camera; first driving means mounted on said first lever means in actuating relationship with said second lever means; pawl means mounted on said second lever means; ratchet means in unidirectional driving relationship with the film winding means of said camera and positioned in driven relationship with said pawl means; and resilient means for returning each of said first and second lever means to their starting positions.

2. Photographic camera apparatus comprising a camera body including a shutter mechanism and a film winding mechanism; bearing means mounted on said camera body; control lever means mounted in said bearing means to rotate therein; shutter tensioning lever means in spaced coaxial relationship with said control lever means; driving stud means fixedly mounted on said control lever means in driving relationship with said shutter tensioning lever means; pawl means mounted on said shutter tensioning lever means; ratchet means in spaced coaxial relationship with both of said control lever means and said shutter tensioning lever means and positioned in driven relationship with said pawl means; driving gear means in coaxial fixed relationship with said ratchet means; driven gear means in meshing relationship with said driving gear means to actuate said film winding mechanism; and resilient means for returning each of said control lever means and said shutter tensioning lever means to their starting positions.

3. Photographic camera apparatus comprising a camera body including a shutter mechanism and a film winding mechanism; cylindrical bushing means mounted on said body having an inner bearing surface and an outer bearing surface; operating lever means comprising a cylindrical bearing member seated within said bushing means, lever arm means extending at substantially right angles from the axis of said cylindrical bearing member, and actuating pin means having one end affixed to said lever arm means and positioned in substantially parallel relationship to the primary axis of said cylindrical bearing member; gear means rotatable about the primary axis of said cylindrical bushing means on the outer bearing surface thereof and in operating relationship to said film winding mechanism; ratchet means rotatable about said primary axis of said cylindrical bushing means and in fixed relationship with said gear means; means positioned between said cylindrical bushing means and both of said gear means and ratchet means whereby the rotation of said gear means and ratchet means about said cylindrical bushing means is limited to a predetermined arc; intermediate lever means rotatable about a common axis of rotation with said ratchet means and in close axial relationship thereto, said lever means positioned to be driven by said actuating pin means and in operating relationship to tension said shutter mechanism; pawl means mounted on said intermediate lever means in driving relationship with said ratchet means; and resilient means positioned to return said intermediate lever means and said operating lever means to their starting positions.

References Cited in the file of this patent

UNITED STATES PATENTS

| 2,153,606 | Albert | Apr. 11, 1939 |
| 2,246,034 | Elison | June 17, 1941 |

FOREIGN PATENTS

| 778,211 | France | Dec. 15, 1934 |
| 747,615 | Great Britain | Apr. 11, 1956 |